3,263,286
PROCESS AND MATERIAL FOR PRECISION
INVESTMENT CASTING
Claude H. Watts, Lyndhurst, and Michael Daskivich, Cleveland, Ohio, assignors to Precision Metalsmiths, Inc.
No Drawing. Filed Apr. 26, 1965, Ser. No. 451,036
15 Claims. (Cl. 22—164)

This application is a continuation-in-part of application Serial No. 235,558, filed November 5, 1962, for Process and Material for Precision Investment Casting, and now abandoned.

This invention relates generally to the art of investment casting, and more specifically to novel improvements in the "lost-wax" process of precision investment casting.

In the so-called "lost-wax" process of conventional investment casting, a disposable pattern, which is a replica of the part to be cast and which includes the necessary gates and risers, is usually dipped in a refractory slurry which hardens to form a smooth coating that serves as the mold face. After this precoat or dipcoat has dried, the coated pattern is placed in a suitable heat-resistant flask and the flask is filled with a cementitious refractory material, known as the investment, which hardens at room temperature to form the bulk of the mold. The completed investment mold is subsequently heated to remove the pattern material so that metal or other molten material can be poured into the mold and allowed to solidify.

The precoating or dipcoating of the pattern usually is carried out by dipping the pattern into a suspension of a fine refractory powder in a suitable liquid binder that is capable of hardening during drying at room conditions. Following dipping, the excess slurry is drained from the pattern and the coating is stuccoed while wet with coarser refractory particles which help to set the coating and to facilitate bonding between the coating and the back-up investment material.

More recently, there has been a growing trend in the industry to use ceramic shell molds in place of the conventional, bulky investment molds described above. This development of ceramic shell mold techniques has been promoted by the decided advantages which shell molds offer in many applications. For example, as compared with conventional investment molds, ceramic shell molds are lighter and easier to handle, exhibit increased permeability and thermal shock resistance, provide for easier knock-out and clean-up after casting, do not require flasks, and provide greater flexibility in processing.

Ceramic shell molds are usually prepared by repeating the dipping and stuccoing operations described above until a refractory shell having a sufficient thickness to resist the stresses occurring in subsequent operations is built up around the pattern. The usual thickness range is from one-eighth of an inch to one-half of an inch, although thinner or heavier shells may be formed for special situations. After forming the refractory shell mold, the disposable pattern is then removed from the mold and it is prepared for the casting operation.

The typical pattern materials heretofore used in both the bulk investment and ceramic shell molding processes have been either wax blends or plastics such as polystyrene and, occasionally, polyethylene. For reasons to be discussed hereinafter, wax patterns have been most widely employed even though the art has recognized that, in many instances, plastic patterns offer decided advantages. Plastic patterns can be made by injection molding equipment at much higher production rates than can be obtained with wax pattern-forming operations. In addition, plastic patterns can be handled easily without breaking and do not crack at low temperatures or soften at high temperatures normally encountered.

With either wax or plastic patterns, a critical stage in the preparation of both investment molds and ceramic shell molds has been the elimination of the pattern material. For example, when a mold is heated in an attempt to melt or burn out the enveloped pattern, severe internal pressures are created by the thermal expansion of the pattern material. In most instances the conventional bulk investment molds are strong enough to withstand the pressure cerated by wax patterns so that the patterns can be removed without serious cracking. Nevertheless, some cracking of investment molds frequently will occur, this being particularly true when plastic patterns are used, and thus casting flash is still a fairly common defect.

Ceramic shell molds, on the other hand, do not have sufficient strength to resist the internal pressure created by relatively slow heating of the pattern material. In the case of wax patterns, the frequency of mold cracking has been reduced by a procedure known as "flash dewaxing." According to this procedure, the shell mold is placed directly into a furnace at an elevated temperature, for example, from about 1600° F. to about 2000° F. Under these conditions the heat transfer through the shell is so rapid that a surface skin of wax melts before the bulk of the wax can heat up enough to crack the shell. As the bulk of the wax does heat up, the molten surface material either flows out of the mold or soaks through the shell. This action provides a space to accommodate the subsequent expansion of the bulk of the wax so that it will not crack the shell.

Another technique which has been used to remove wax patterns from ceramic shell molds involves subjecting the mold to an atmosphere of steam in an autoclave at a temperature above the melting point of the pattern material. When processed in this manner, the pressure of the steam on the outside of the mold counteracts the expansion force of the wax, whereby the wax pattern can be melted without cracking the mold. The time in which the molds can be dewaxed depends to a large extent upon the quantity of wax to be melted; however, as with the flash dewaxing method, it is necessary that the mold be subjected as quickly as possible to steam at the required temperature and pressure in order to avoid slow heating of the wax.

Attempts to remove plastic patterns from ceramic shell molds by heating, such as in an autoclave or by the flash dewaxing concept, have not been successful. Apparently, the conventional plastics soften very gradually without significant melting at the mold interface. As a result, plastic patterns will expand and crack shell molds before becoming fluid enough either to be absorbed into the mold or to squeeze out of the mold opening. Furthermore, the conventionally used plastics, especially polystyrene, tend to decompose rapidly when heated to elevated temperatures, and it is believed that the vapors which are evolved become trapped in the remaining viscous plastic to produce a foaming mass which further increases the cracking pressure within the mold.

The only known pattern removal technique heretofore developed which permits the combined use of plastic patterns and ceramic shell molds involves the steps of at least partially dissolving the pattern by the application of a liquid solvent and thereafter heating the mold to volatize any remaining pattern material. Usually the solvent is applied at room temperature by soaking the molds in a solvent bath. While the solvent-soaking technique has been commercially practiced on a large scale with satisfactory results, it does necessitate extra operations that are not required in the more conventional shell molding practice using wax patterns which can be heated and melted by the procedures described above.

Because of the foregoing, there has existed a need for improved pattern materials and pattern processing techniques which would facilitate precision investment casting operations. In particular, there has been a need for disposable pattern materials which can be injection molded and handled in the advantageous manner of plastic patterns and, at the same time, removed from ceramic shell molds by heating procedures that takes full benefit of the above-discussed advantages offered by shell molds. As will be explained in detail, the present invention satisfies these needs.

Thus, one object of the invention is to provide a heat-disposable pattern material suitable for making patterns to be used in the "lost wax" process of precision investment casting.

Another object of the invention is to provide a composition of matter which can be injection molded in the manner of conventionally used synthetic plastics to produce patterns of the type described above.

A further object of the invention is to provide an injection moldable pattern material which can be removed from ceramic shell molds by methods that permit optimum processing of the molds.

A related object of the invention is to provide method improvements in the art of precision investment casting comprising the steps of preparing a heat disposable pattern material, injection molding patterns from the material in the shape of the articles to be produced, forming around the patterns a refractory shell mold suitable for casting metal, and removing the patterns from the mold by heating.

The novel composition of matter which comprises one aspect of the invention is an organic, plastic type of material which is characterized by its ability to be injection molded by conventional plastic injection equipment so as to form patterns having substantially the same size and dimensions as injection molded polystyrene patterns. This characteristic is of particular importance, since polystyrene patterns have been produced for several years and, therefore, tooling and molding equipment are already in existence. Thus, this existing tooling and equipment can be used without significant alteration to process the novel pattern material of the invention.

Furthermore, the novel pattern material can be injection molded without the formation of internal voids or air pockets, and can produce patterns having thick cross-sections up to one-half inch or greater which are free of surface cavitations or "sinks." Because of these advantageous properties of the material, excellent dimensional tolerances can be obtained, and the occurrence of defectively formed patterns which would result in scrap castings is substantially avoided.

Also, the pattern material has good mold release properties so that the patterns can be stripped from the molds easily and cleanly without breaking. As is known to those familiar with injection molding operations, a certain amount of flash on molded patterns is nearly always present, especially along the gates and runner systems. With patterns formed of the material provided by this invention, the flash will strip clean with the parts so that time-consuming cleaning operations between each shot are not required. Thus, the entire injection molding operation can be carried out economically and at high production rates.

Other important characteristics of the pattern material include low volumetric expansion when heated and the characteristic of surface melting to a low viscosity liquid when "torched" or exposed to temperatures in the range of from about 1600° F. to 2300° F. As distinguished from the conventionally used plastics, such as polystyrene, patterns formed of the new material can be melted in the manner of wax patterns by flash dewaxing or in an autoclave without cracking the mold. From this it will be seen that the invention permits processing of ceramic shell molds in a manner which takes full benefit of their many advantages.

Other objects and advantages of the invention will be made apparent by the following detailed description and the accompanying claims.

GENERAL DESCRIPTION AND TYPICAL PROPERTIES

In accordance with the preceding general discussion, the invention provides a novel composition of matter having the following distinguishing characteristics:

(1) A softening point as determined by the A.S.T.M. ring and ball method (A.S.T.M. E28–51T) in the range of from about 210° F. to about 220° F.

(2) Injection moldable on a conventional plastic injection molding machine in the range of from about 130° F. to about 250° F.

(3) Immediate surface melting to a low viscosity liquid when subjected to high oven temperatures in the range of from about 1600° F. to about 2300° F.

The following is a general formulation for the novel pattern material composition exhibiting the foregoing properties:

| | Percent by weight |
|---|---|
| Vinyl resin | 5–40 |
| Wax | 10–50 |
| Compatible organic material | 30–70 |

A more specific composition is as follows:

| | Percent by weight |
|---|---|
| Ethylene/vinyl acetate copolymer | 5–40 |
| Paraffin wax | 10–30 |
| Compatible organic material | 30–70 |

Another specific composition is as follows:

| | Percent by weight |
|---|---|
| Ethylene/vinyl acetate copolymer | 5–20 |
| Extra hard, high melting point synthetic wax | 0–15 |
| Petroleum-base wax blend including a paraffin wax | 15–35 |
| Compatible resin | 30–50 |

The following is a still more specific composition:

| | Percent by weight |
|---|---|
| Modified pale wood rosin | 30–50 |
| Ethylene/vinyl acetate copolymer | 5–20 |
| Fischer-Tropsch wax | 0–15 |
| Paraffin wax | 10–20 |
| Microcrystalline wax | 5–15 |

A vinyl resin is used in the novel pattern material as a toughener and to provide the necessary strength and flexibility which makes injection molding of the material possible. As little as 5% by weight of the vinyl resin will produce a usable material for some applications, and in other applications satisfactory results are obtained with as much as 40%. However, the vinyl resin is a relatively expensive ingredient and it has been found that little or no improvements are obtained by amounts in excess of 20%. For these reasons, the preferred working range of vinyl resin is from about 5% to about 20% by weight and the optimum amount is approximately 15%.

The preferred vinyl resin is an amorphous, high molecular weight copolymer of ethylene and vinyl acetate sold under the trademark Elvax 250 by the E. I. du Pont de Nemours & Company, Inc. Elvax Grade 250 vinyl resin may be identified by the following typical properties:

| | |
|---|---|
| Inherent viscosity at 30° C. (0.25% by weight in toluene) | 0.85 |
| Comonomer ratio, ethylene:vinyl acetate, wt. percent | 71:29 |
| Melt index (A.S.T.M. D–1238–57T) | 15 |

Tensile strength, p.s.i. _____ 2000
Elongation at break, percent _____ 750
Density, g./cc. at 30° C. _____ 0.95
Refractive index, $N_D^{25}$ _____ 1.482
Softening point (A.S.T.M ring and ball), ° F. ___ 276

As generally described above, a substantial part of the new composition consists of an organic material which can be compatibly blended with the vinyl resin to impart many of the properties desired of the pattern material. In particular, the invention contemplates a pattern material which will result in a blended composition having low thermal expansion and contraction. These properties impart to the pattern material dimensional stability and make it possible to produce patterns with practically no "sinks" or surface cavitations even in heavy sections up to one-half inch in thickness or more. The organic material is preferably characterized by a volumetric expansion of less than 5% when heated from 70° F. to 220° F. and by substantially immediate surface melting to a low viscosity liquid when subjected to temperatures in the range of from about 1600° F. to about 2300° F., whereby the patterns can be melted, such as in an autoclave or by flash-dewaxing methods, without cracking the molds. Also, the softening point of the organic material should fall in the range of from about 130° F. to about 250° F.

Organic materials which have been used successfully include various polymerized resins, both natural and synthetic. Suitable natural resins are polymerized or modified rosins and the like. The synthetic resins include coumarone-indene resins, ester gums and other thermoplastic materials capable of being heated to a low viscosity, mobile liquid, as distinguished from plastics such as polystyrene. Still other materials which are contemplated for use include commercial abietic acid, various waxes, and mixtures of the foregoing.

Modified pale wood rosins have been found particularly satisfactory for the purposes set forth. A preferred modified pale wood rosin is sold under the trademark Poly-pale resin by the Hercules Powder Company. The preferred Pole-pale resin has the following typical chemical and physical properties:

Softening point (A.S.T.M. ring and ball method),
° F. _____ 201
Acid No. _____ 148
Saponification No. _____ 160
Unsaponifiable material, percent _____ 7
Specific rotation, percent _____ −2.8
Refractive index at 20° C. _____ 1.5440
Density at 20° C. _____ 1.073
Volumetric expansion from 84° F. to 200° F.,
percent _____ 2.5

Although Poly-pale resin has been disclosed as the preferred polymerized rosin, a pale-colored hydrogenated rosin sold under the trademark Stabelite resin by the Hercules Powder Company, and various grades of Hercules wood rosins can be used. As described above, the organic material, such as the Poly-pale resin or its equivalent may be present in a range of from about 30% to about 70% by weight and, more preferably, in a range from about 30% to about 50% by weight.

The wax used in the pattern material composition of the invention may include an extra hard wax having a high melting point. The use of a wax having these characteristics is preferred in most applications, since it aids in providing faster solidification rates so that the injection molding cycles are not unduly long and also because it imparts sufficient rigidity to the pattern material to resist distortion during shipping or handling. However, in instances where a flexible pattern material is satisfactory, the hard wax can be eliminated entirely.

Waxes which have been used satisfactorily for the purposes described above are extra hard mineral waxes consisting of paraffinic hydrocarbons of high molecular weight. Typical waxes of this type are synthesized from the basic constituents of carbon monoxide and hydrogen by the Fischer-Tropsch process and are commonly known as Fischer-Tropsch waxes. The most desirable range of Fischer-Tropsch wax is about 10% to about 15% by weight. It has been found that percentages higher than 20% by weight result in blends having poor injection characteristics.

A preferred Fischer-Tropsch wax is sold under the trade name F–T 300 in this country through Dura Commodities Corporation, New York City, N.Y. F–T 300 exhibits the following typical properties:

Melting point (capillary tube)_____ 221° F.
Penetration (100 g., 5 sec., 77° F.)_____ Less than 1.0.
Density at 68° F. _____ About 0.933.
Viscosity at 266° F. (centistokes)_____ About 10.7.
Color _____ White.
Solidification point (rotating
    thermometer)_____ 98–102° C.
Softening (drop) point _____ 110–112° C.
Saponification number _____ 0.
Flash point _____ About 280° C.
Fire point _____ About 310° C.
Iodine number _____ 3–5.
Acid number _____ 0.
Hydroxyl number _____ 0.
Toluene insoluble, percent _____ 0.

The pattern material composition of the invention includes a paraffin wax or its equivalent. The paraffin wax has the important function of imparting mold release properties to the pattern material so as to make it feasible for the material to be injection molded and then easily and satisfactorily removed from the die. Pattern material compositions exhibiting satisfactory mold release properties have been made using as little as 10% and as much as 30% by weight of the paraffin wax. However, when the paraffin wax was used as a single wax ingredient in an amount exceeding about 20% by weight of the composition, it was found that a longer dwell cycle was required in the injection molding operation in order to allow the pattern material to solidify. It was also found that amounts of paraffin wax in excess of 20% by weight tended to result in the occurrence of surface cavitations or "sinks" in the mold patterns.

Preferably, although not necessarily, the compositions of the invention comprise a blend of the paraffin wax with another petroleum base wax, such as a microcrystalline wax or the like. The preferred petroleum base wax blend acts as a coupling agent to assure a compatible blend of the vinyl resin in the organic material, for example, the polymerized rosin. It also provides a compatible combination of the polymerized rosin or other organic material with the Fischer-Tropsch wax. In addition, both the paraffin wax and the microcrystalline wax contribute substantially to the flash dewaxing characteristic of the pattern material.

Several types of the so-called paraffin waxes have been used with some success for the purposes described above. However, a high melting point paraffin wax sold under the trade name Sun Wax 5512 by the Sun Oil Company has been found the most satisfactory and is the preferred material. This wax is of relatively low molecular weight, has relatively large crystals, and is somewhat slippery to the touch. Additional properties by which this wax may be identified are as follows.

Melting point, degrees F. (A.S.T.M. D127–49)___ 153
Penetration at (A.S.T.M. D1321–57T):
    77° F. _____ 9
    90° F. _____ 12
    100° F. _____ 15
    110° F. _____ 20
    120° F. _____ 29
    130° F. _____ 50

Oil content, percent by wt. (A.S.T.M. D721–56T)_ .3
Viscosity, centistokes at 210° F. (A.S.T.M. D445–
53T) _____ 5.5
Specific gravity at 60° F. _____ 0.928
Flash (open cup), degrees F. (A.S.T.M. D9257)__ 470

A satisfactory microcrystalline wax is sold under the trade name Sun Wax 5825 by the Sun Oil Company. This wax is of relatively high molecular weight and is obtained by solvent crystallization methods from wax distillation media. Additional properties of Sun Wax 5825 are as follows.

Melting point, degrees F. (A.S.T.M. D127–49)___ 153
Penetration at (A.S.T.M. D1321–57T):
    77° F. _____ 21
    90° F. _____ 31
    100° F. _____ 45
    110° F. _____ 100
Oil content, percent by wt. (A.S.T.M. D721–56T)_ 0.7
Viscosity, centistokes at 210° F. (A.S.T.M.
D445–T) _____ 15.4
Specific gravity at 60° F. _____ 0.928
Flash (open cup), ° F. (A.S.T.M. D92–57)_____ 560

Example I

A 140 pound production batch of the novel pattern material was prepared according to the following preferred formulation:

| | Percent by weight |
|---|---|
| Poly-pale resin (polymerized rosin) | 43 |
| Sun Wax 5825 (microcrystalline wax) | 9 |
| F-T 300 (Fischer-Tropsch wax) | 14 |
| Sun Wax 5512 (paraffin wax) | 19 |
| Elvax Grade 250 (vinyl resin) | 15 |

In the preferred method of preparation, all of the raw materials except for the Elvax 250 vinyl resin are added to a wax melting kettle, such as an electrically heated wax melting pot or a jacketed kettle, which is capable of melting and heating the mixture to a temperature in the range of from about 270° F. to about 300° F. Subsequently, the Elvax 250 vinyl resin is added to the other melted ingredients while stirring.

Using a Sta-Warm electrically heated wax melting pot, type No. 53 WS, Serial No. A–184–B6, approximately 12 hours were required to melt and heat the above formulation of Poly-pale resin and waxes to about 270° F. Then the Elvax 250 vinyl resin in pelletized form was added slowly to the melting pot while stirring. Approximately 10 minutes were required to add 21 pounds of the vinyl resin to the other melted ingredients.

After the vinyl resin had been added, the completed blend was stirred for approximately one hour to completely melt the pellets of vinyl resin and assure a uniform blend of all the ingredients. The batch was then run out into trays and cooled to form solid blocks of plastic material approximately one inch in thickness. This material was found to have a softening point of approximately 214° F., as determined by the A.S.T.M. ring and ball method.

In use, the large blocks of plastic are next broken into smaller chunks of irregular shape approximately two inches by four inches by one inch in thickness which were fed into the hopper of a plastic chopper. Suitable machines for this purpose are commercially available and serve to further reduce the chunks of plastic to granules of irregular shape measuring from about one-eighth inch to about three-sixteenths in length, width and thickness. Some fine powder also may be produced; however, the exact size of the granules is not critical, since the only requirement is that the pelletized material be of a size such that it can be fed from the chopper into the injection cylinder of a plastic injection machine.

For best results and ease in pelletizing, the solid blocks of plastic material are preferably further cooled by refrigeration to a temperature of from about 30° F. to about 50° F. prior to breaking up the solid blocks into smaller chunks. Cooling of the material to the temperatures indicated will do no harm; although, it has been found that at temperatures of about 0° F. and lower the material becomes so brittle that a high percentage of fines are produced during the pelletizing process.

The pattern material prepared according to this example was injection molded using a conventional Van Dorn plastic injection machine operating at approximately 800 p.s.i. line pressure and with an injection temperature of approximately 160° F. to form a plurality of patterns of a typical commercial part suitable for manufacture by precision casting. As will be recognized by those familiar with the operation of plastic injection machines of the type described, a line pressure of approximately 800 p.s.i. is the equivalent of a ram pressure of approximately 6160 p.s.i. The injection molded patterns included the gates and runner system. It was found that the injection time required for the patterns was approximately two-thirds of that required to mold the same patterns of polystyrene with the same machine.

A set-up of patterns was made by attaching the patterns to a wax gating system using an electrically heated wax-welding tool. A six-dip shell mold was then formed around the set-up using a suspension of zircon (zirconium silicate) flour and fused silica flour in a bonding liquid consisting mainly of colloidal silica sol with small amounts of an organic film former, a wetting agent, and a de-foaming agent. The first two dips were sanded with a granular zircon and the remainder of the dips with a coarse fireclay grog of about −20 +50 mesh. Each dip was allowed to dry thoroughly before application of the next dip coating. Following the application of the sixth and final coating, the mold was allowed to dry over night. The final wall thickness of the mold was approximately 3/16 of an inch.

After drying over night, the mold was placed directly into a gas-fired furnace operating at 2000° F. and was allowed to remain in the furnace for about 10 minutes or until the last vestiges of pattern material had been removed. When the mold was taken from the furnace, it was found that there was no cracking or other defects.

A similar shell, processed in the same manner except that polystyrene patterns were used, cracked badly during the flash dewaxing operation on the portion of the shell surrounding the plastic patterns. Furthermore, it was found that even 12 dip coatings did not build up a sufficient thickness around the plastic patterns to permit the flash dewaxing operation to be carried out successfully.

Example II

A quantity of pattern material having the ingredients intimately blended while molten and substantially uniformly distributed throughout the material at room temperature was prepared according to Example I. The material was similarly injection molded to form workpiece patterns and the patterns used to produce a ceramic shell mold.

In this example of the invention, the patterns were heated and melted from the mold using a standard autoclave. The autoclave was preheated to approximately 255.4° F. and the mold containing the patterns to be removed was then placed into the autoclave. The mold was subjected as quickly as possible to the action of steam at a pressure of 18 p.s.i. gauge and a temperature of 255.4° F. so as to avoid slow heating of the patterns.

After about 10 minutes, it was found that substantially all of the pattern material had been removed from the mold and that it was free of cracks and suitable for casting metal. Similar molds containing patterns formed of the same composition were processed successfully in the autoclave at steam pressures up to 50 p.s.i. gauge and temperatures up to 297.7° F.

Example III

Another quantity of pattern material was prepared according to the following formulation:

| | Percent by weight |
|---|---|
| Elvax (ethylene/vinyl acetate copolymer) | 20 |
| Paraffin wax | 30 |
| Poly-pale resin (polymerized rosin) | 50 |

The foregoing ingredients were blended together in the manner described in Example I. The material was cooled and thereafter injection molded to form workpiece patterns. These patterns were used to produce a ceramic shell mold. The mold containing the patterns was successfully subjected to flash dewaxing conditions and the patterns were melted without cracking the mold.

Although the results were generally satisfactory, it was found that a relatively long dwell period was necessary in the injection molding operation due to the longer time required for solidification of the material. Substantially shorter dwell periods were obtained using compositions having wax blends and an amount of paraffin wax in the range of from about 10% to about 20% by weight. It was also found that some surface cavitations resulted in the injection molded patterns.

Example IV

| | Percent by weight |
|---|---|
| Elvax (ethylene/vinyl acetate copolymer) | 20 |
| Coumarone-indene resin (volumetric expansion 2.5% from 84° F. to 200° F.) | 50 |
| Paraffin wax | 30 |

This composition was blended, injection molded and the patterns used to produce a ceramic shell mold as described in the previous examples. The mold was successfully processed by flash dewaxing procedures without cracking, and the results were similar to that obtained in Example III except that the dwell period of the injection molding machine was somewhat shorter.

Example V

| | Percent by weight |
|---|---|
| Elvax (ethylene/vinyl acetate copolymer) | 35 |
| Coumarone-indene resin (same as Example IV) | 55 |
| Paraffin wax | 10 |

This composition was successfully injection molded to form workpiece patterns and the patterns were removed by flash dewaxing from the ceramic shell mold without cracking. No advantage was found in the increased amount of the ethylene/vinyl acetate copolymer as compared to Example I.

SUMMARY

It will be apparent from the foregoing that the invention provides a novel pattern material composition which makes is possible to produce patterns quickly and economically with plastic injection machines in the same manner that polystyrene patterns heretofore have been made. Thus, the invention makes it possible to obtain all of the production and handling advantages of plastic parts or patterns.

In addition, the improved pattern material lends itself to pattern removal operations involving the application of heat which heretofore have been usable only in conjunction with wax patterns. Hence, patterns made of the new pattern material can be utilized in the ceramic shell molding process of investment casting without the relatively expensive and often time-consuming solvent soaking operations heretofore required for the removal of plastic patterns.

Many modifications and variations of the invention will be apparent to those skilled in the art in view of the foregoing detailed disclosure. Therefore, it is to be understood that, within the scope of the appended claims, the invention can be practiced otherwise than as specifically described.

What is claimed is:

1. A molded workpiece pattern for forming a casting mold comprising from about 30% to about 50% by weight of a modified pale wood rosin, from about 5% to about 15% by weight of a high molecular weight ethylene/vinyl acetate copolymer, and from about 25% to about 50% by weight of blended waxes, said pattern being free of solvents and having the foregoing ingredients blended while molten and substantially uniformly distributed throughout the pattern at room temperature, and said pattern being further characterized by a softening point in the range of from about 210° F. to about 220° F. and by substantially immediate surface melting to a low viscosity liquid when subjected to a temperature in the range of from about 1600° F. to about 2300° F.

2. A molded workpiece pattern for forming a casting mold consisting essentially of from about 30% to about 50% by weight of a modified pale wood rosin, approximately 15% by weight of a high molecular weight ethylene/vinyl acetate copolymer, and from about 35% to about 50% by weight of blended waxes, said blended waxes including a paraffin wax, said pattern being free of solvents and having the foregoing ingredients blended while molten and substantially uniformly distributed throughout the pattern at room temperature, and said pattern being further characterized by a softening point in the range of from about 210° F. to about 220° F. and by substantially immediate surface melting to a low viscosity liquid when subjected to a temperature in the range of from about 1600° F. to about 2300° F.

3. An injection moldable pattern material composition comprising from about 30% to about 50% by weight of a polymerized rosin, from about 5% to about 20% by weight of a high molecular weight ethylene/vinyl acetate copolymer, and from about 25% to about 35% by weight of a petroleum-base wax blend, said wax blend including a paraffin wax in the range of from about 10% to about 20% by weight, said material being a solid at room temperature, being substantially free of solvents, and having the foregoing ingredients intimately blended while molten and substantially uniformly distributed throughout the material at room temperature, and said material being further characterized by being injection moldable at a temperature of from about 130° F. to about 250° F. and by substantially immediate surface melting to a low viscosity liquid when subjected to a temperature in the range of from about 1600° F. to about 2300° F.

4. An injection moldable pattern material composition comprising from about 30% to about 50% by weight of a modified pale wood rosin, from about 5% to about 20% by weight of an ethylene/vinyl acetate copolymer, from about 25% to about 35% by weight of a petroleum-base wax blend, and an amount of an extra-hard mineral wax composed of paraffinic hydrocarbons up to a maximum of approximately 20% by weight, said material being a solid at room temperature, being substantially free of solvents, and having the foregoing ingredients intimately blended while molten and substantially uniformly distributed througout the material at room temperature, and said material being further characterized by being injection moldable at a temperature of from about 130° F. to about 250° F. and by substantially immediate surface melting to a low viscosity liquid when subjected to a temperature in the range of from about 1600° F. to about 2300° F.

5. A pattern material composition comprising from about 30% to about 50% by weight of a modified pale wood rosin, from about 5% to about 20% by weight of a high molecular weight ethylene/vinyl acetate copolymer, from about 25% to about 35% of a petroleum base wax blend, said wax blend including a paraffin wax in the range of from about 10% to about 20% by weight, and approximately 15% by weight of a relatively hard, high melting point synthetic wax, said material being a solid at room temperature, being substantially free of solvents, and having the foregoing ingredients intimately blended while molten and susbtantially uniformly distributed throughout the material at room temperature, and said material being further characterized by being injection moldable at a temperature of from about 130° F. to about 250° F. and by substantially immediate surface melting to a low viscosity liquid when subjected to a temperature in the range of from about 1600° F. to about 2300° F.

6. A pattern material composition comprising from about 30% to about 50% by weight of a polymerized rosin, approximately 15% by weight of a high molecular weight ethylene/vinyl acetate copolymer, and the remainder a wax blend of from about 25% to about 35% by weight of petroleum-base waxes, said petroleum-base waxes including a paraffin wax, and up to about 15% by weight of a Fischer-Tropsch wax, said composition being further characterized by a softening point in the range of from about 210° F. to about 220° F. and by substantially immediate surface melting to a low viscosity liquid when subjected to a temperature in the range of from about 1600° F. to about 2300° F.

7. A pattern material composition comprising from about 30% to about 50% by weight of a polymerized rosin, from about 5% to about 20% by weight of an ethylene/vinyl acetate copolymer, and from about 25% to 30% by weight of a blend of microcrystalline wax and paraffin wax, said microcrystalline wax and paraffin wax being respectively present in minimum amounts of 5% and 10% by weight of the entire composition, said material being a solid at room temperature, being substantially free of solvents, and having the foregoing ingredients intimately blended while molten and substantially uniformly distributed throughout the material at room temperature, and said material being further characterized by being injection moldable at a temperature of from about 130° F. to about 250° F. and by substantially immediate surface melting to a low viscosity liquid when subjected to a temperature in the range of from about 1600° F. to about 2300° F.

8. A pattern material composition comprising from about 30% to about 50% by weight of a polymerized rosin, from about 5% to about 20% by weight of a high molecular weight ethylene/vinyl acetate copolymer, and the remainder a wax blend including from about 5% to about 15% by weight microcrystalline wax, from about 10% to about 20% by weight paraffin wax, and from about 1% to about 15% by weight of a Fischer-Tropsch wax.

9. A pattern material composition comprising from about 35% to about 50% by weight of a modified pale wood rosin, approximately 15% by weight of an ethylene/vinyl acetate copolymer, from about 10% to about 20% by weight of a high melting point paraffin wax of relatively low molecular weight, from about 5% to about 15% of a microcrystalline wax of relatively high molecular weight, and from about 10% to about 15% by weight of a hard mineral wax, said composition being further characterized by a softening point in the range of from about 210° F. to about 220° F., and by substantially immediate surface melting to a low viscosity liquid when subjected to a temperature in the range of from about 1600° F. to about 2300° F.

10. A molded workpiece pattern for forming a casting mold comprising from about 5% to about 20% by weight of an ethylene/vinyl acetate copolymer, from about 25% to about 35% by weight of blended waxes, said wax blend including a paraffin wax in the range of from about 10% to about 20% by weight of said composition, and from about 30% to about 50% by weight of a compatible organic material having a softening point less than 250° F. the characteristic of immediate surface melting to a low viscosity liquid when subjected to a temperature in the range of from about 1600° F. to about 2300° F. and a volumetric expansion less than 5% when heated in the range of from 70° F. to 220° F., said pattern being a solid at room temperature, being substantially free of solvents and having the foregoing ingredients intimately blended while molten and substantially uniformly distributed throughout at room temperature.

11. A process of producing a refractory mold for use in investment casting comprising:
(a) preparing a blended composition containing from about 30% to about 50% by weight polymerized rosin, from about 5% to about 20% by weight of an ethylene/vinyl acetate copolymer, and from about 25% to about 50% by weight wax,
(b) molding said composition to form workpiece patterns,
(c) forming around said patterns a refractory mold suitable for casting, and
(d) heating said mold to melt said patterns from said mold.

12. In a process of ceramic shell molding, the steps of:
(a) preparing a blended composition containing from about 30% to about 50% by weight polymerized rosin, from about 5% to about 20% by weight of an ethylene/vinyl acetate copolymer, and from about 25% to about 50% by weight of waxes;
(b) said blended composition being prepared to have a softening point in the range of from about 210° F. to about 220° F., and the characteristics of being injection moldable and of substantially immediate surface melting to a low viscosity liquid in the range of from about 1600° F. to about 2300° F.;
(c) injection molding said composition to form patterns;
(d) forming around said patterns a refractory shell mold suitable for sasting; and
(e) removing said patterns from said mold by heating in a range of from about 1600° F. to about 2300° F.

13. In a process of ceramic shell molding, the steps of:
(a) preparing a solidified mass of pattern material containing from about 30% to about 50% by weight polymerized rosin, from about 5% to about 20% by weight of an ethylene/vinyl acetate copolymer, and from about 25% to about 50% by weight of blended waxes including a paraffin wax in the range of from about 10% to about 20% by weight;
(b) said pattern material being prepared to have a softening point in the range of from about 210° F. to about 220° F., and the characteristics of being injection moldable and of substantially immediate surface melting to a low viscosity liquid when heated to a temperature in the range of from about 1600° F. to about 2300° F.;
(c) pelletizing said material;
(d) introducing said pelletized material into the injection cylinder of an injection molding machine and injection molding said material to form a pattern shape, said material being injection molded at a temperature of from about 130° F. to about 250° F.;
(e) forming around said pattern shape a refractory shell mold; and
(f) removing said pattern shape from said mold by heating in a temperature range of from about 1600° F. to about 2300° F.

14. In a process of investment casting, the steps of:
(a) melting and blending together the following ingredients:
(i) from about 5% to about 40% by weight of an ethylene/vinyl acetate copolymer,
(ii) from about 30% to about 70% by weight of a compatible organic material having a softening point less than 250° F., the characteristic of rapid surface melting to a low viscosity liquid when subjected to a temperature in the range of from about 1600° F. to about 2300° F., and volumetric expansion of less than 5% when heated in the range of from 70° F. to 220° F.,
(iii) at least 10% by weight of a paraffin wax, (b) cooling the blend to a solid state and thereafter injection molding the solid material to form a workpiece pattern,
(c) forming around the pattern a one-piece mold suitable for casting metal,
(d) heating the mold to melt the pattern from the mold.

15. A molded workpiece pattern for forming a casting mold comprising from about 5% to about 40% by weight of a vinyl resin, from about 30% to about 70% by weight of a compatible organic material having a softening point less than about 250° F., the characteristic of rapid surface melting to a low viscosity liquid when subjected to a temperature in the range of from about 1600° F. to about 2300° F. and volumetric expansion of less than 5% when heated in the range of from about 70° F. to about 220° F., and wax in the range of from about 10% to about 50% by weight, said pattern being free of solvents and having the foregoing ingredients blended while molten and substantially uniformly distributed throughout the pattern at room temperature, and said pattern being further characterized by substantially immediate surface melting to a low viscosity liquid when subjected to temperatures in the range of from about 1600° F. to about 2300° F.

References Cited by the Examiner
UNITED STATES PATENTS

| | | | |
|---|---|---|---|
| 2,461,416 | 2/1949 | Erdle et al. | 22—195 |
| 2,752,653 | 7/1956 | Emblem et al. | 22—196 |

FOREIGN PATENTS

| | | |
|---|---|---|
| 645,914 | 11/1950 | Great Britain. |
| 519,718 | 3/1955 | Italy. |

J. SPENCER OVERHOLSER, *Primary Examiner.*